US008501362B2

(12) United States Patent
Amemiya (10) Patent No.: US 8,501,362 B2
(45) Date of Patent: Aug. 6, 2013

(54) FUEL CELL STACK

(75) Inventor: Kazuki Amemiya, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/121,089

(22) PCT Filed: Sep. 22, 2010

(86) PCT No.: PCT/JP2010/005736
§ 371 (c)(1),
(2), (4) Date: Mar. 25, 2011

(87) PCT Pub. No.: WO2012/039005
PCT Pub. Date: Mar. 29, 2012

(65) Prior Publication Data
US 2012/0070759 A1    Mar. 22, 2012

(51) Int. Cl.
*H01M 2/40* (2006.01)
(52) U.S. Cl.
USPC ........... 429/456; 429/429; 429/455; 429/437; 429/480
(58) Field of Classification Search
USPC ................. 429/434, 456, 437, 455, 429, 480
See application file for complete search history.

(56) References Cited

U.S. PATENT DOCUMENTS

| | | | |
|---|---|---|---|
| 5,902,691 A * | 5/1999 | Matzkin-Bridger | 429/469 |
| 6,833,214 B2 * | 12/2004 | Funatsu et al. | 429/434 |
| 6,872,483 B2 | 3/2005 | Sugiura et al. | |
| 2005/0112422 A1 * | 5/2005 | Yoshimoto et al. | 429/19 |
| 2005/0136306 A1 | 6/2005 | Sugiura et al. | |
| 2008/0152983 A1 * | 6/2008 | Horiuchi et al. | 429/30 |

FOREIGN PATENT DOCUMENTS

| | | |
|---|---|---|
| JP | 2000-12067 A | 1/2000 |
| JP | 2002-367665 A | 12/2002 |
| JP | 2003-77498 A | 3/2003 |
| JP | 2003-272698 A | 9/2003 |
| JP | 2005-183304 A | 7/2005 |
| JP | 2006-114244 A | 4/2006 |
| JP | 2006-179381 A | 7/2006 |
| JP | 2008-159448 A | 7/2008 |
| JP | 2008-186783 A | 8/2008 |
| WO | 03/107466 A1 | 12/2003 |

* cited by examiner

*Primary Examiner* — Patrick Ryan
*Assistant Examiner* — Alex Usyatinsky
(74) *Attorney, Agent, or Firm* — Sughrue Mion, PLLC (57) ABSTRACT

A fuel cell stack includes a plurality of fuel cell modules. Each of the fuel cell modules has a first membrane electrode assembly and a second membrane electrode assembly respectively having an electrolyte membrane and being arranged, such that respective first electrodes are opposed to each other. The fuel cell module also has a first reactive gas flow path arranged to supply a first reactive gas to the first electrodes included in the first membrane electrode assembly and the second membrane electrode assembly, a second reactive gas flow path arranged to supply a second reactive gas to the second electrodes included in the first membrane electrode assembly and the second membrane electrode assembly, and a coolant flow path arranged to cool down the second electrodes included in the first membrane electrode assembly and the second membrane electrode assembly. The fuel cell stack does not have a coolant flow path for cooling down the first electrodes, but has a first flow path-forming member located between the first membrane electrode assembly and the second membrane electrode assembly to define the first reactive gas flow path.

5 Claims, 10 Drawing Sheets

Fig.8B ANODE COOLING WATER TEMP / CATHODE COOLING WATER TEMP
80°C/80°C (SAMPLE No. 1)

Fig.8C ANODE COOLING WATER TEMP / CATHODE COOLING WATER TEMP
60°C/80°C (SAMPLE No. 2)

Fig.8D ANODE COOLING WATER TEMP / CATHODE COOLING WATER TEMP
70°C/90°C (SAMPLE No. 3)

FUEL CELL STACK

CROSS REFERENCE TO RELATED APPLICATION

This application is a National Stage of International Application No. PCT/2010/005736 filed Sep. 22, 2010, the contents of all of which are incorporated herein by reference in their entirety.

TECHNICAL FIELD

The present invention relates to a fuel cell stack.

BACKGROUND ART

Fuel cells are generally used in the form of a fuel cell stack. The fuel cell stack includes a plurality of fuel cells and coolant flow paths arranged to cool down the anodes and the cathodes of the fuel cells (for example, Patent Literature 1). Each fuel cell has a membrane electrode assembly and a reactive gas flow path arranged to supply a reactive gas to the membrane electrode assembly.

CITATION LIST

Patent Literature 1: JP-A-2008-186783
Patent Literature 2: JP-A-2006-114244
Patent Literature 3: WO-A-2003/107466

DISCLOSURE OF THE INVENTION

The fuel cell stack is mounted on various moving bodies including vehicles and boats and ships to be utilized as a power source. The fuel cell stack may also be installed in various facilities to be utilized as a power source. There is a great demand for size reduction for the easy installation. Some conventional structures of the fuel cell stack are, however, inadequate for the sufficient size reduction.

By taking into account the issue discussed above, there is a requirement for providing a technique to enable size reduction of a fuel cell stack.

In order to address at least part of the requirement described above, the present invention provides various embodiments and applications described below.

[First Aspect]

A fuel cell stack, comprising:
a plurality of fuel cell modules stacked in a predetermined direction,
each of the fuel cell modules comprising:
a first membrane electrode assembly and a second membrane electrode assembly, each including an electrolyte membrane and a first electrode and a second electrode arranged to sandwich two faces of the electrolyte membrane, wherein the first membrane electrode assembly and the second membrane electrode assembly are arranged, such that the respective first electrodes are opposed to each other;
a first reactive gas flow path arranged to supply a first reactive gas to the first electrodes included in the first membrane electrode assembly and the second membrane electrode assembly;
a second reactive gas flow path arranged to supply a second reactive gas to the second electrodes included in the first membrane electrode assembly and the second membrane electrode assembly; and
a coolant flow path arranged to cool down the second electrodes included in the first membrane electrode assembly and the second membrane electrode assembly,
wherein the fuel cell stack does not have a coolant flow path for cooling down the first electrodes, but has a first flow path-forming member located between the first membrane electrode assembly and the second membrane electrode assembly to define the first reactive gas flow path.

The fuel cell stack according to the first aspect does not have the coolant flow path for cooling down the two opposed first electrodes in the first and the second membrane electrode assemblies. This arrangement effectively enables size reduction, compared with a fuel cell stack having a coolant flow path for cooling down the first electrodes.

[Second Aspect]

The fuel cell stack in accordance with the first aspect, wherein the first flow path-forming member comprises a porous body enabling supply of the first reactive gas to the first electrodes included in the first membrane electrode assembly and the second membrane electrode assembly.

In the fuel cell stack according to the second aspect, the first flow path-forming member is made of the porous body. This arrangement facilitates the supply of the first reactive gas to the first electrodes in the first and the second membrane electrode assemblies located on both sides of the first flow path-forming member.

[Third Aspect]

The fuel cell stack in accordance with the second aspect, wherein the first flow path-forming member is a plate member having a first face opposed to the first membrane electrode assembly and a second face opposed to the second membrane electrode assembly, and
the first reactive gas flow path is provided as channels formed on the first face and the second face.

In the fuel cell stack according to the third aspect, the channels are formed on both faces of the plate member to supply the first reactive gas to the first electrodes in the first and the second membrane electrode assemblies.

[Fourth Aspect]

The fuel cell stack in accordance with any one of the first aspect through the third aspect, further comprising:
an insulator located between an adjacent pair of the fuel cell modules,
wherein the coolant flow path is formed inside the insulator.

The fuel cell stack according to the fourth aspect does not require a separate member including a coolant flow path, independently of the insulator. This arrangement enables further size reduction.

[Fifth Aspect]

The fuel cell stack in accordance with any one of the first aspect through the fourth aspect, wherein the first electrode is a cathode, and
the second electrode is an anode.

The electrolyte membrane generally has the characteristic of containing the greater amount of water at the higher temperature. Water is generated on the cathode through an electrochemical reaction. The fuel cell stack according to the fifth aspect does not have the coolant flow path on the cathode side but has the coolant flow path on the anode side, so that the cathode, on which water is generated, is kept at the higher temperature than the anode. A cathode-side area of the electrolyte membrane accordingly has the capacity of containing a greater amount of water than its anode-side area. The gradient of the water content in the electrolyte membrane causes diffusion of water from the cathode-side area to the anode-side area. This arrangement enables size reduction of the fuel cell stack and substantially equalizes the moisture content of the electrolyte membrane.

[Sixth Aspect]

The fuel cell stack in accordance with any one of claims 1 through 5, further comprising:

an external circuit arranged to electrically connect the first membrane electrode assembly and the second membrane electrode assembly in parallel with each other.

The fuel cell stack according to sixth aspect enables electricity to be collected from the fuel cell stack including the first and the second membrane electrode assemblies arranged, such that the respective first electrodes are opposed to each other.

The technique of the invention is not restricted to the fuel cell stack having any of the configurations and arrangements discussed above but may be actualized by diversity of other applications, for example, a vehicle (moving body) with such a fuel cell stack mounted thereon and a facility equipped with such a fuel cell stack.

DESCRIPTION OF THE EMBODIMENTS

Figure 1:
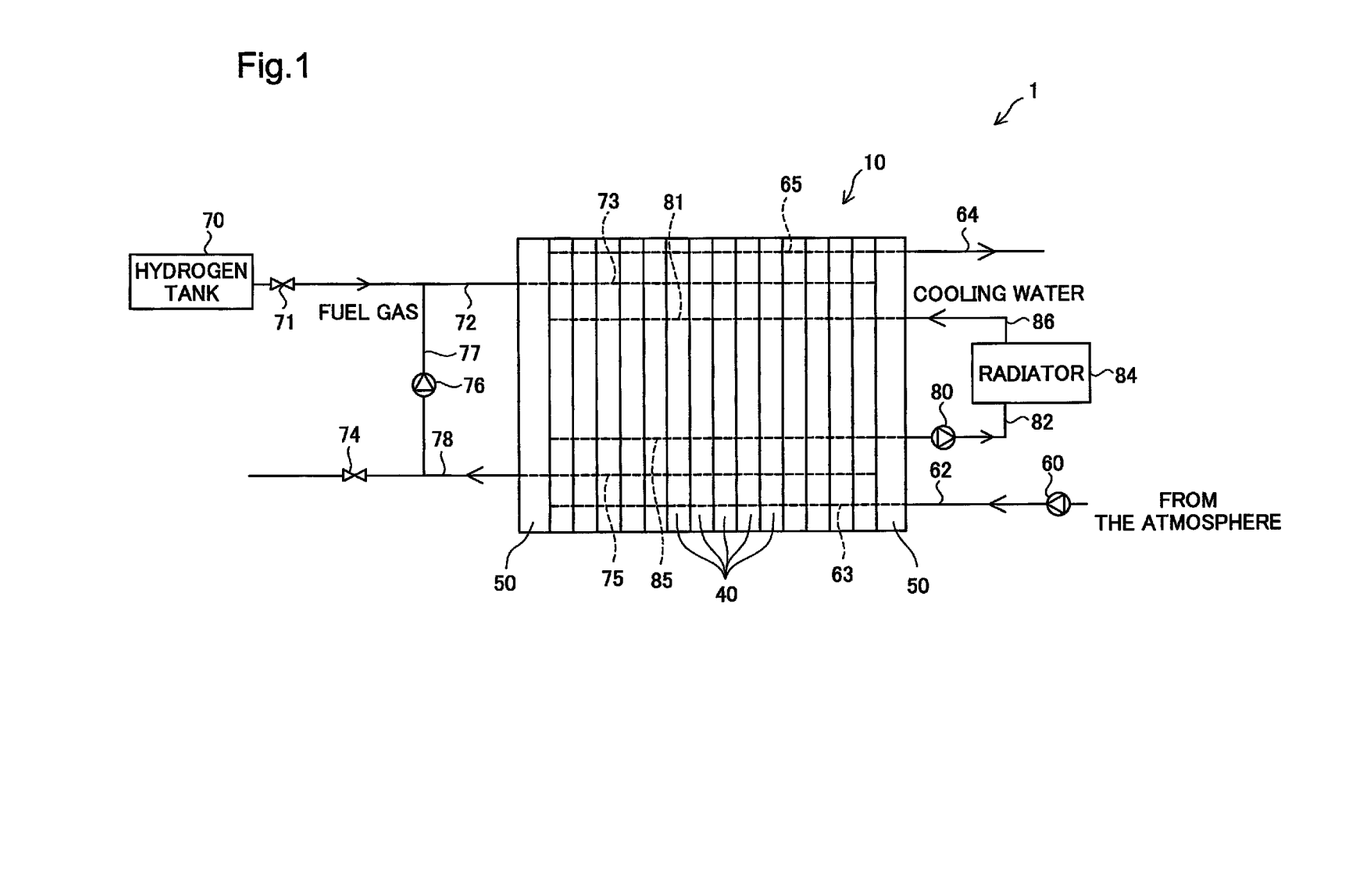
FIG. 1 is an explanatory diagrammatic representation of the general configuration of a fuel cell system 1.

Some modes of carrying out the invention are discussed below in the following sequence:
A. First Embodiment
B. Second Embodiment
C. Third Embodiment
D. Modifications
A. First Embodiment
A-1. Configuration of Fuel Cell System FIG. 1 is an explanatory diagrammatic representation of the general configuration of a fuel cell system 1 including a fuel cell stack 10 as a first embodiment of the invention. The fuel cell system 1 of the first embodiment is mounted on, for example, a vehicle and is used as a power source of the vehicle. The fuel cell system 1 includes a fuel cell stack 10, an air pump 60 serving as an oxidizing gas supplier, a hydrogen tank 70 serving as a fuel gas supplier, a radiator 84 serving as a coolant supplier, and a controller (not shown) provided to control the operations of the fuel cell system. The fuel cell system 1 further includes pipings 62, 64, 72, 78, 82, and 86 each arranged to allow passage of one of reactive gases and a coolant, valves 71 and 74, and circulation pumps 76 and 80.

The fuel cell stack 10 is composed of polymer electrolyte fuel cells that are relatively small in size but have excellent power generation efficiency. The fuel cell stack 10 has a stack structure obtained by stacking a plurality of fuel cell modules 40 via insulators (not shown). The fuel cell modules 40 are stacked in the direction of thickness of the respective fuel cell modules 40 and are sandwiched between a pair of end plates 50 located on both ends thereof. Each of the fuel cell modules 40 has two membrane electrode assemblies (MEA) discussed below. The internal structure of the fuel cell stack 10 will be discussed later in detail.

The fuel cell stack 10 has an oxidizing gas supply manifold 63, an oxidizing gas exhaust manifold 65, a fuel gas supply manifold 73, a fuel gas exhaust manifold 75, a coolant supply manifold 81, and a coolant discharge manifold 85 formed therein.

Hydrogen as a fuel gas is supplied from the hydrogen tank 70 provided for storage of high pressure hydrogen through the fuel gas supply piping 72 and the fuel gas supply manifold 73 to the membrane electrode assemblies (more specifically, anodes) in each of the fuel cell modules 40. The valve 71 is provided in the fuel gas supply piping 72 to regulate the hydrogen supply. The hydrogen supplied to the membrane electrode assemblies (more specifically, anodes) is subjected to electrochemical reactions for power generation. Anode off-gas as the hydrogen passing through the anodes is discharged outside via the fuel gas exhaust manifold 75 and the fuel gas exhaust piping 78. The fuel cell system 1 also has the fuel gas circulation piping 77 arranged to connect the fuel gas supply piping 72 with the fuel gas exhaust piping 78 and the circulation pump 76. The anode off-gas may be circulated and resupplied to the fuel cell stack 10 via the fuel gas circulation piping 77 and the fuel gas supply piping 72 by controlling the valve 74 and the circulation pump 76.

The air as an oxidizing gas is supplied by driving the air pump 60 through the oxidizing gas supply piping 62 and the oxidizing gas supply manifold 63 to the membrane electrode assemblies (more specifically, cathodes) in each of the fuel cell modules 40. The air supplied to the membrane electrode assemblies (more specifically, cathodes) is subjected to electrochemical reactions for power generation. Cathode off-gas as the air passing through the cathodes is discharged outside via the oxidizing gas exhaust manifold 65 and the oxidizing gas exhaust piping 64.

Cooling water as a coolant is supplied by the radiator 84 via the coolant supply piping 86 and the coolant supply manifold 81 to the respective fuel cell modules 40. The cooling water passing through the respective fuel cell modules 40 is sent to the radiator 84 via the coolant discharge piping 82 by the circulation pump 80 and is resupplied to the inside of the fuel cell stack 10 via the coolant supply piping 86. The coolant is not restricted to water, but may be any suitably selected cooling medium, for example, an antifreeze liquid, such as ethylene glycol, or the air.

A-2. Structure of Fuel Cell Stack

Figure 2:
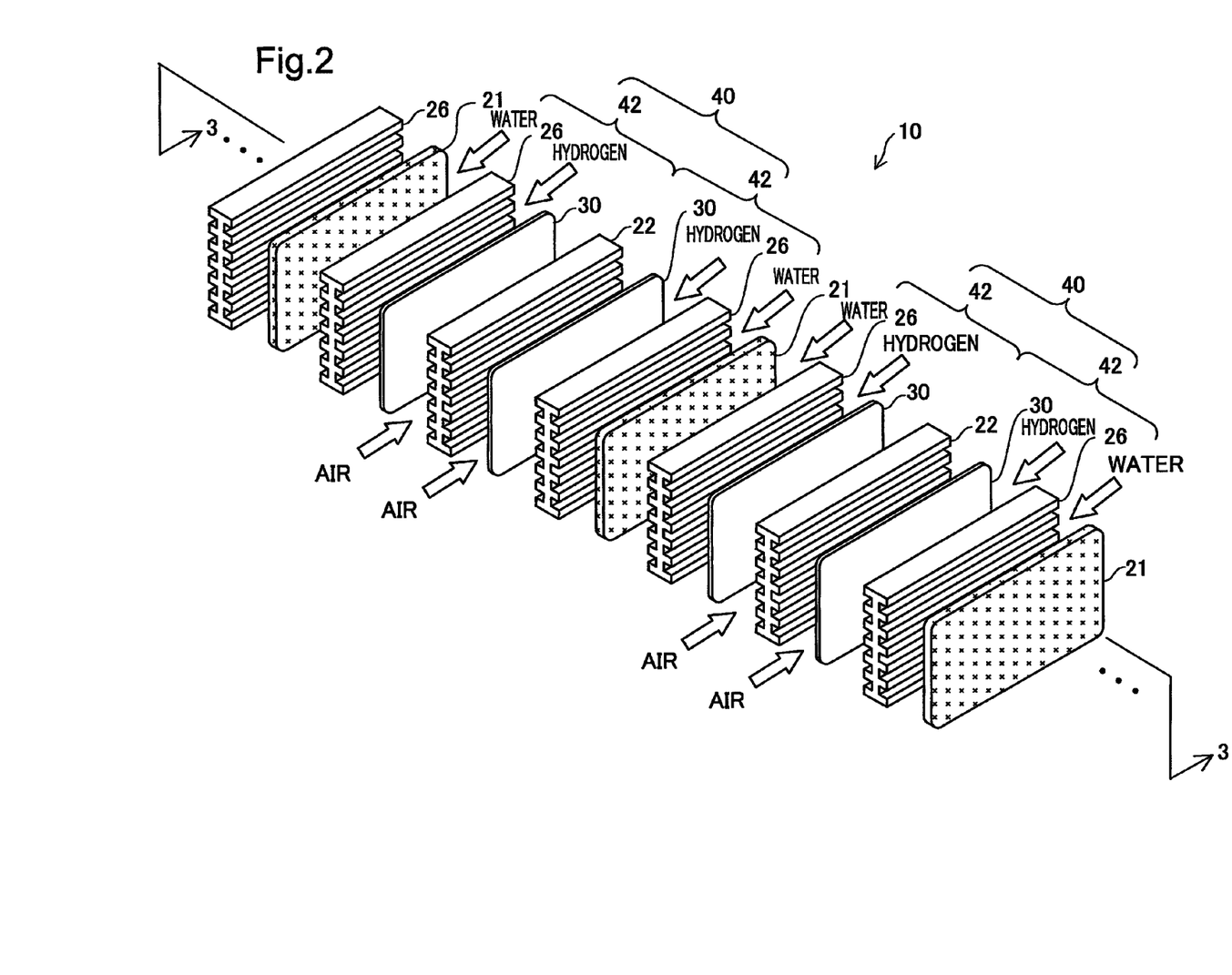
FIG. 2 is an explanatory diagrammatic representation of the internal structure of a fuel cell stack 10.

FIG. 2 is an explanatory diagrammatic representation of the internal structure of the fuel cell stack 10. The general structure of the fuel cell stack 10 is illustrated in FIG. 2. The fuel cell stack 10 has the plurality of fuel cell modules 40 stacked in the direction perpendicular to the respective faces of the components, insulators 21 located between respective adjacent pairs of the fuel cell modules 40, and an external circuit (not shown). The fuel cell module 40 has two fuel cells 42. The two fuel cells 42 are arranged, such that corresponding electrodes of the same polarity are opposed to each other. Each of the fuel cells 42 has a membrane electrode-gas diffusion layer assembly (MEGA) 30 provided by forming and joining gas diffusion layers on and with both sides of a membrane electrode assembly, and a first separator 22 and a second separator 26 arranged to sandwich two faces of the MEGA. The first separator 22 and the second separator 26 are plate members with channels formed on both faces thereof. The reactive gases (the air and hydrogen) and the cooling water distributed and supplied from the respective manifolds 63, 73, and 86 (FIG. 1) are flowed through these channels. The reactive gases flowing through the channels are supplied to the respective electrodes of the MEGA 30 to be subjected to the electrochemical reactions for power generation. The flow of the cooling water is utilized for the temperature regulation of the fuel cell stack 10. As discussed above, the channels formed on both faces of the first and the second separators 22 and 26 serve as the flow paths of the reactive gases and the cooling water.

Figure 3:
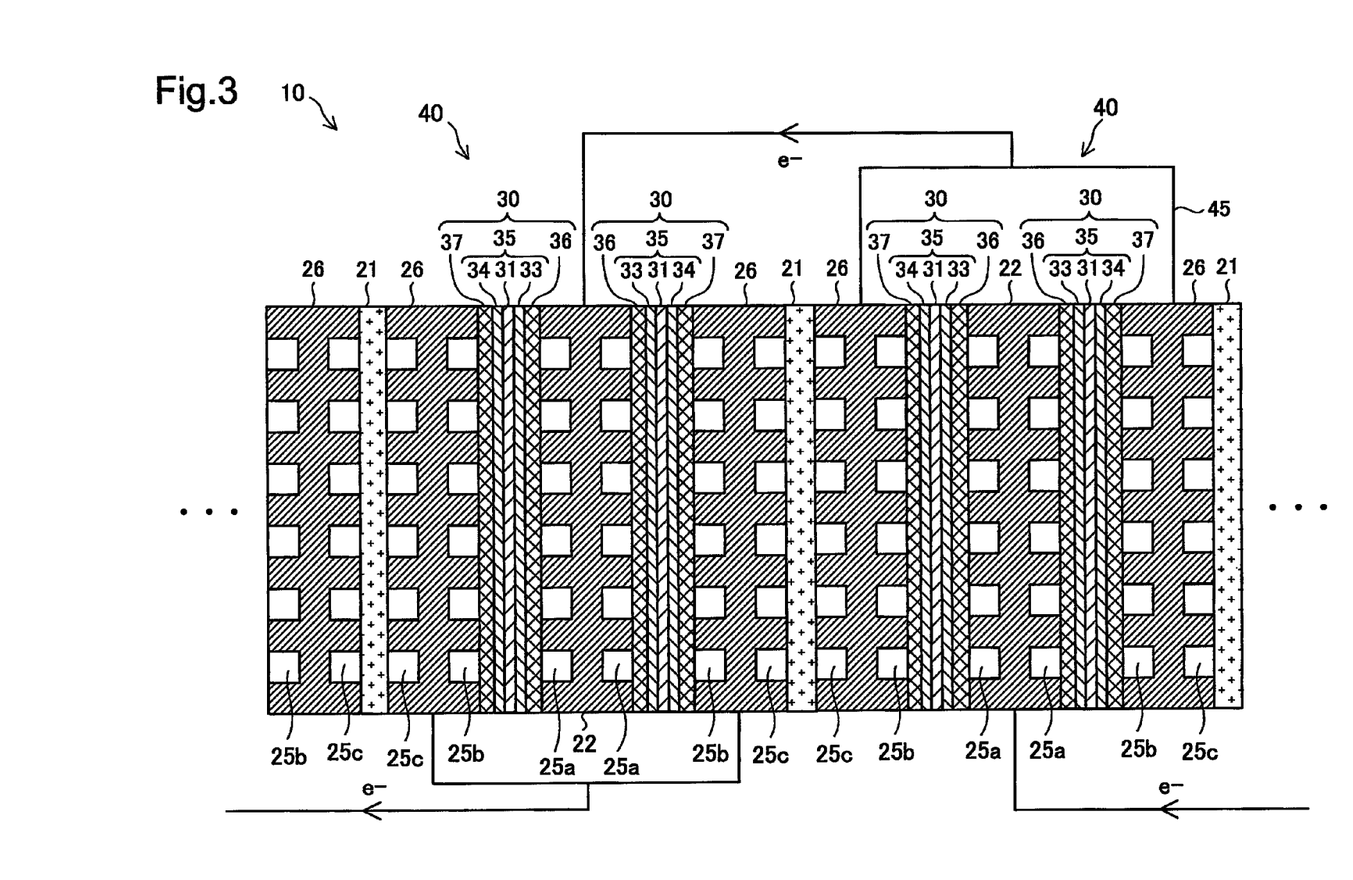
FIG. 3 is a sectional view taken on the line 3-3 of FIG. 2.

FIG. 3 is a sectional view taken on the line 3-3 of FIG. 2. The detailed structure of the fuel cell stack 10 is described with reference to FIG. 3. The MEGA 30 includes an MEA (membrane electrode assembly) 35 and a cathode gas diffusion layer 36 and an anode gas diffusion layer 37 arranged to sandwich (joined with) the two faces of the MEA 35. The MEA 35 has an electrolyte membrane 31, a cathode 33 or a first electrode, and an anode 34 or a second electrode. The cathode 33 and the anode 34 are arranged to sandwich the two faces of the electrolyte membrane 31.

The electrolyte membrane 31 is a proton-conductive ion exchange membrane made of a solid polymer material, e.g., a fluororesin and has good electrical conductivity in the wet condition. The electrolyte membrane 31 is accordingly a solid polymer electrolyte membrane in this embodiment.

Each of the cathode 33 and the anode 34 contains a catalyst (e.g., platinum or a platinum alloy) and is formed by making the catalyst supported on a conductive carrier (e.g., carbon particles). A concrete procedure of forming each of the cathode 33 and the anode 34 provides carbon powder with a catalyst metal, such as platinum, supported thereon, mixes the catalyst-supported carbon powder with an electrolyte, which is the same as the material electrolyte of the electrolyte membrane, to prepare a catalyst paste, and applies the catalyst paste on the electrolyte membrane.

The cathode gas diffusion layer 36 and the anode gas diffusion layer 37 are made of an electrically conductive material having gas permeability, for example, carbon paper or carbon cloth. The MEA 35 is located between and integrated with the gas diffusion layers 36 and 37 by press forming. In each of the fuel cell modules 40, the two MEAs 35 are arranged such that the corresponding electrodes of the same polarity are opposed to each other. In this embodiment, the two MEAs 35 are arranged such that their cathodes 33 are opposed to each other.

The first separator 22 is located between the two MEGAs 30 in each of the fuel cell modules 40. The second separators 26 are arranged to sandwich the two MEGAs 30. The first separator 22 and the second separator 26 are plate members composed of an electrically conductive material having gas impermeability, for example, dense carbon obtained by compressing carbon to be gas impermeable, fired carbon, or a metal material like stainless steel. Channels 25a and channels 25b and 25c are formed on the respective faces of the first separator 22 and on the respective faces of the second separator 26.

The first separator 22 has the channels 25a formed thereon, and the air supplied from the oxidizing gas supply manifold 63 (FIG. 1) is flowed through these channels 25a. The air flowing through the channels 25a is diffused via the cathode gas diffusion layers 36 in the planar direction of the MEGAs 30 and is supplied to the two cathodes 33 included in each of the fuel cell modules 40. The first separator 22 accordingly serves as a common (single) flow path-forming member for supplying the air to the two opposed cathodes 33. The common member (first separator 22) thus defines the air supply flow path for the two fuel cells 42 (FIG. 2) of the fuel cell module 40. There is no coolant flow path of the cooling water formed between the two MEGAs 30.

The second separator 26 has the channels 25b and 25c formed thereon, and hydrogen supplied from the fuel gas supply manifold 73 is flowed through the channels 25b formed on one face of the second separator 26 opposed to the anode 34. The hydrogen flowing through the channels 25b is diffused via the anode gas diffusion layers 37 in the planar direction of the MEGAs 30 and is supplied to the two anodes 34 included in each of the fuel cell modules 40. The cooling water supplied from the coolant supply manifold 81 (FIG. 1) is flowed through the channels 25c formed on the other face of the second separator 26 different from the face opposed to the anode 34. The channels 25c formed to define the flow path of the cooling water are thus located on the other side of the anode 34 across the channels 25b formed to define the flow path of hydrogen. This arrangement enables the temperature regulation of the fuel cell stack 10 (mainly the anodes 34). The second separator 26 thus serves both as a flow path-forming member for supplying hydrogen to the anode 34 included in each of the fuel cell modules 40 and as a flow path-forming member for supplying the cooling water to cool down the anode 34.

The first separator 22 and the second separator 26 also serve as collectors for collecting the electricity generated by the MEAs 35 and the first separator 22 and the second separator 26 are electrically connected to the external circuit 45. More specifically, the external circuit 45 is connected in parallel to the two MEAs 35 of the fuel cell module 40.

The insulator 21 is located between each adjacent pair of the fuel cell modules 40, in order to prevent direct contact of the corresponding electrodes of the same polarity in the adjacent pair of the fuel cell modules 40. The insulator 21 may be, for example, a fluororesin sheet or an insulating sheet, such as insulating paper. In this embodiment, a thinner insulating sheet than the first and the second separators 22 and 26 are used for the insulator 21.

Figure 4:
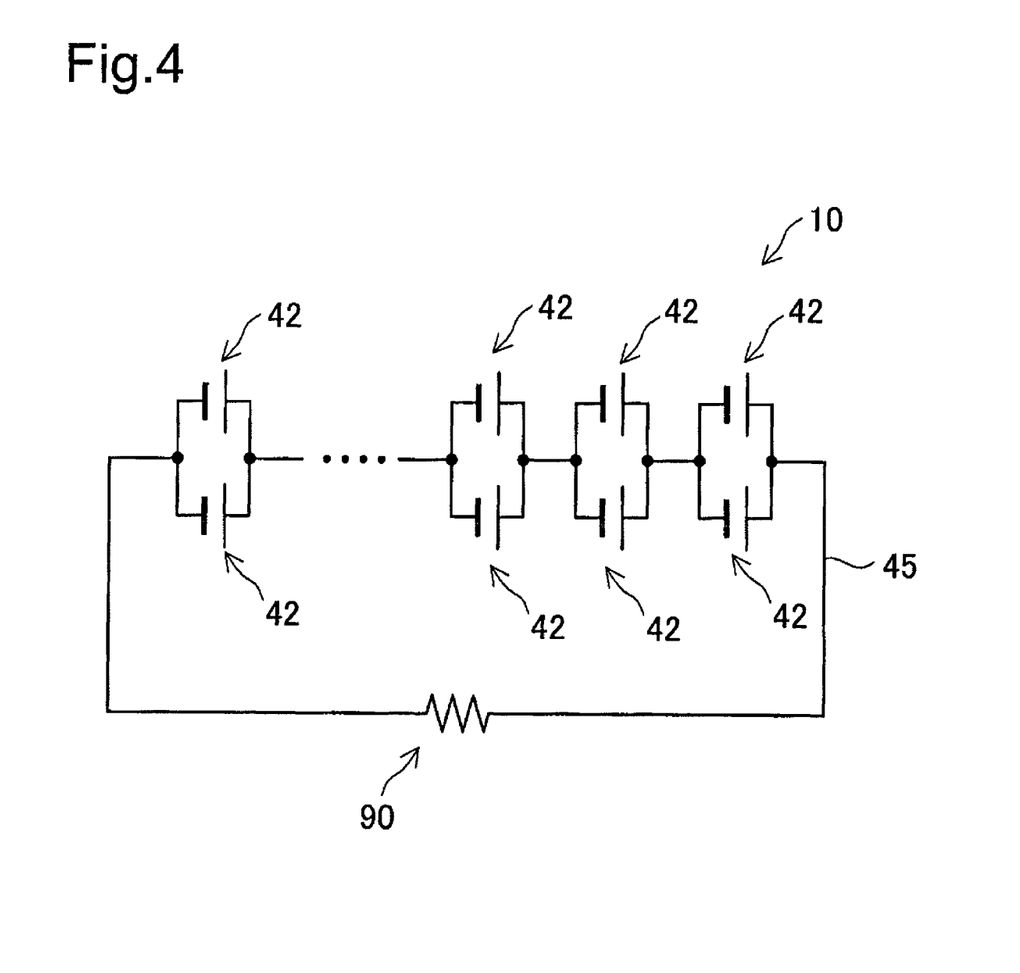
FIG. 4 is an electric circuit diagram of a first embodiment.

FIG. 4 is an electric circuit diagram of the first embodiment. In the circuit structure of the fuel cell stack 10, the two fuel cells 42 constituting each fuel cell module 40 are connected in parallel with each other. A plurality of the parallel-connected pairs of the two fuel cells 42 are connected in series. A load 90 is connected to the external circuit 45. The load 90 may be a driving motor for the vehicle or any of various actuators (for example, the circulation pump 80 and the valve 71) included in the fuel cell system 1. The serial connection of the plural pairs of the two fuel cells 42 connected in parallel preferably enhances the output voltage.

Figure 5A:
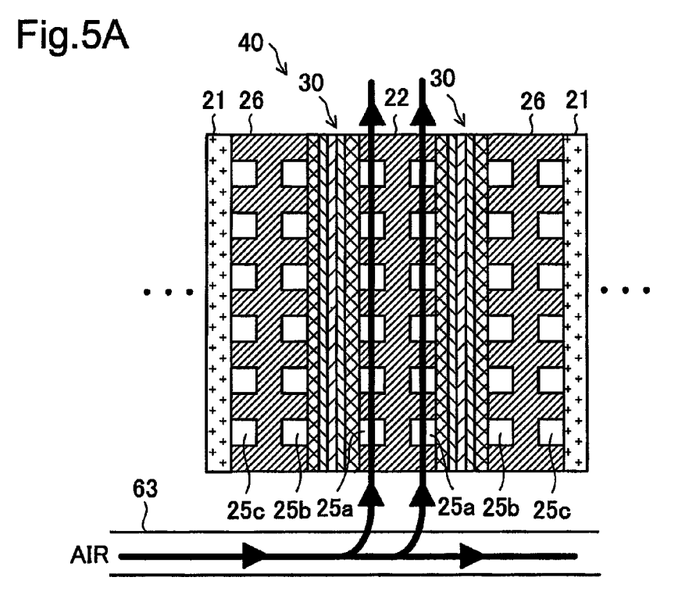
FIGS. 5A and 5B are explanatory diagrammatic representations of methods of supplying the air to opposed cathodes.
Figure 5B:
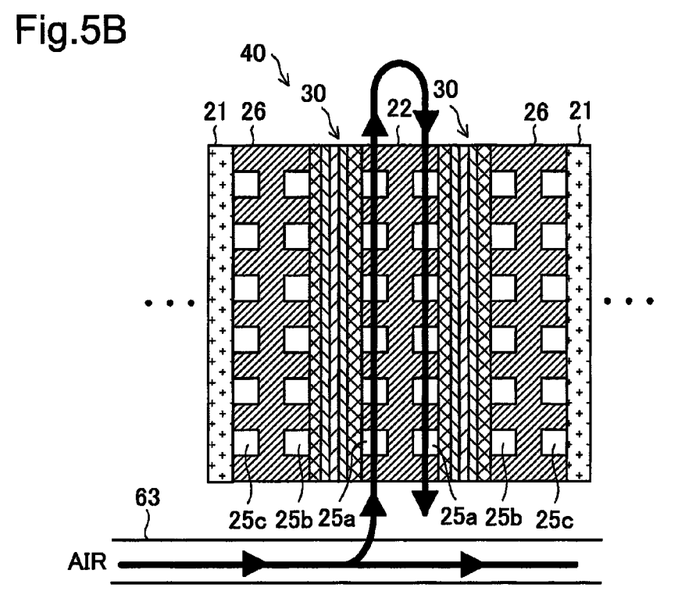

FIGS. 5A and 5B are explanatory diagrammatic representations of methods of supplying the air to the opposed cathodes 33. FIG. 5A is a diagrammatic representation of a first scheme of supplying the air to the opposed cathodes 33, and FIG. 5B is a diagrammatic representation of a second scheme of supplying the air to the opposed cathodes 33.

The fuel cell system 1 may adopt any one of these two different supply schemes for the method of supplying the air to the opposed cathodes 33 in each of the fuel cell modules 40. With reference to FIG. 5A, the first scheme supplies the air from the oxidizing gas supply manifold 63 in parallel to the channels 25a formed on both sides of the first separator 22. This first scheme assures the supply of the air, as one of the reactive gases subjected to the electrochemical reactions, to the two opposed cathodes 33. With reference to FIG. 5B, the second scheme supplies the air from the oxidizing gas supply manifold 63 to the channels 25a ("first channels 25a") formed on one face of the first separator 22 and subsequently supplies the air flowed out of the first channels 25a to the channels 25a formed on the other face of the first separator 22. This second scheme enables the effective use of the air supplied from the oxidizing gas supply manifold 63 to the first separator 22.

A-3. Effects of First Embodiment

Figures 6A, 6B:
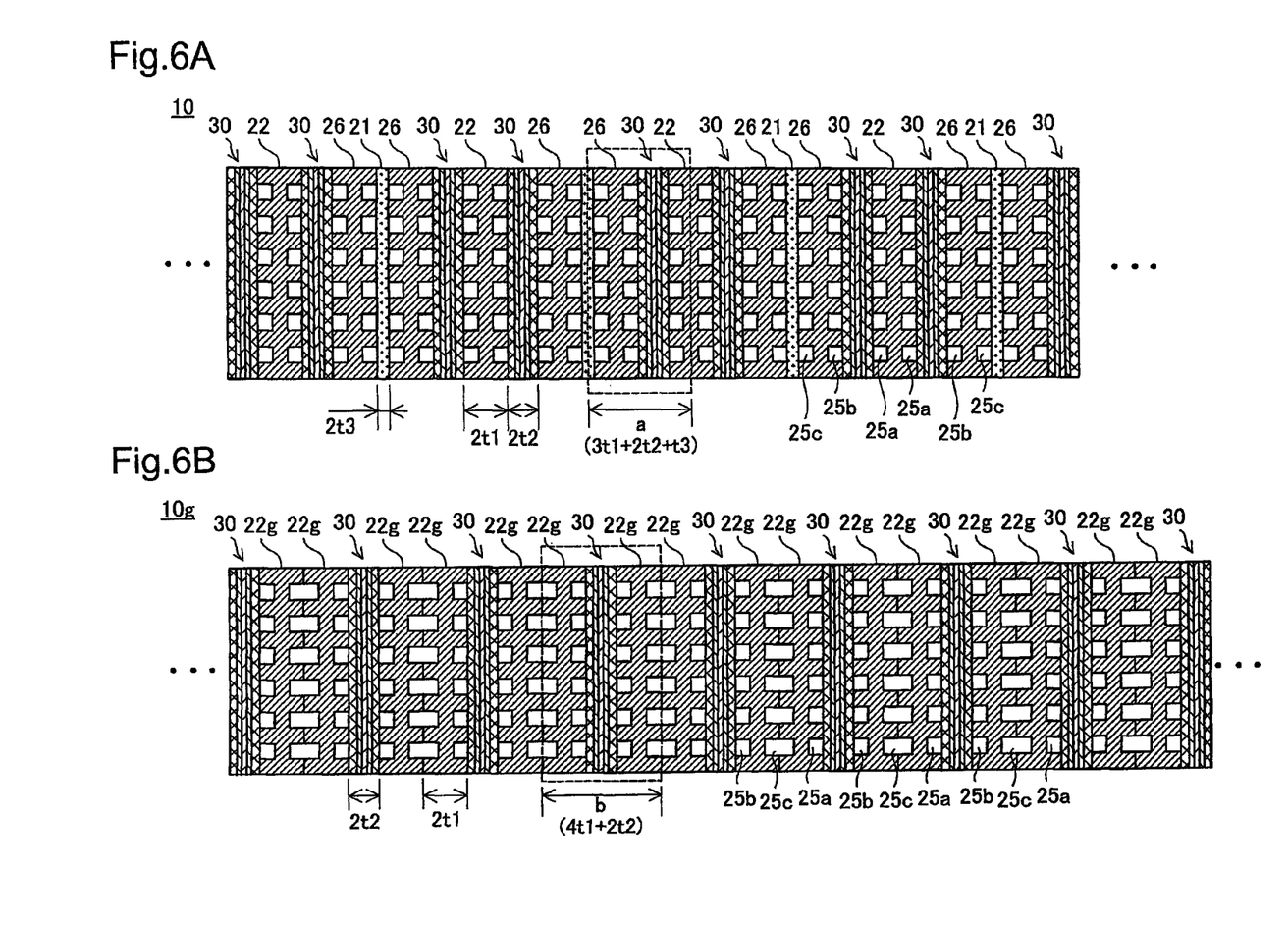
FIGS. 6A and 6B are explanatory diagrammatic representations of the effects of the fuel cell stack 10.

FIGS. 6A and 6B are explanatory diagrammatic representations of the effects of the fuel cell stack 10. FIG. 6A is a 3-3 sectional view of the fuel cell stack 10 of the embodiment, and FIG. 6B is a corresponding 3-3 sectional view of a fuel cell stack 10g as a comparative example. The external circuit is omitted from the illustrations of these fuel cell stacks.

In the fuel cell stack 10g of the comparative example, two adjacent MEGAs 30 are stacked, such that electrodes of different polarities are opposed to each other. The respective fuel cells including the MEGAs 30 are thus connected electrically in series. The fuel cell stack 10g has separators 22g. Each of the separators 22g is composed of an electrically conductive material having gas impermeability, like the first and the second separators 22 and 26. The separators 22g has channels 25a, 25b, 25c formed on the respective faces thereof to define the flow paths of the reactive gas and the cooling water. The thickness of the separators 22g is equal to the thicknesses of the first and the second separators 22 and 26. In the fuel cell stack 10g, two separators 22g are located between each adjacent pair of the MEGAs 30. The air is flowed through the channels 25a formed on a face of one of the two separators 22g opposed to the cathode 33 of one adjoining MEGA 30. The hydrogen is flowed through the channels 25b formed on a face of the other of the two separators 22g opposed to the anode 34 of the other adjoining MEGA 30. The cooling water is flowed through the channels 25c defined by the opposed faces of the two separators 22g to cool down the fuel cell stack 10g (more specifically, the cathodes 33 and the anodes 34). The fuel cell stack 10g accordingly has the coolant flow path for cooling down both the cathodes 33 and the anodes 34.

Here it is assumed that the MEGA 30 has a thickness "2t2" the separators 22, 26, and 22g have a thickness "2t1" and the insulator 21 has a thickness "2t3". It is also assumed that each repeating unit of the fuel cell stack 10 (i.e., the combination of the MEGA 30, the reactive gas channels 25a and 25b, the coolant channels 25c, and the insulator 21) has a thickness It is also assumed that each repeating unit of the fuel cell stack 10g (i.e., the combination of the MEGA 30, the reactive gas channels 25a and 25b, and the coolant channels 25c) has a thickness "b". The thickness "a" is determined according to Equation (1) given below, based on the illustration of FIG. 6A. Meanwhile, the thickness "b" is determined according to Equation (2) given below, based on the illustration of FIG. 6B:

$$\text{Thickness ``}a\text{''}=3t1+2t2+t3 \quad (1)$$

$$\text{Thickness ``}b\text{''}=4t1+2t2 \quad (2)$$

Since the thickness 2t3 of the insulator 21 is smaller than the thickness 2t1 of the separators 22, 26, and 22g, there is Expression (3) given below:

$$\text{Thickness ``}a\text{''}<\text{Thickness ``}b\text{''} \quad (3)$$

As described above, the fuel cell stack 10 of the first embodiment is arranged, such that the electrodes of the same polarity (cathodes 33) are opposed to each other. The fuel cell stack 10 of the first embodiment does not have any coolant flow path for cooling down the two cathodes 33 included in each of the fuel cell modules 40 and adopts the common first separator 22 (FIG. 3) to supply the air to the two opposed cathodes 33. This characteristic structure effectively reduces the thickness "a" of the repeating unit of the fuel cell stack 10 to be smaller than the thickness "b" of the repeating unit of the fuel cell stack 10g of the comparative example. This arrangement preferably enables the size reduction of the fuel cell stack 10, compared with the fuel cell stack 10g having the coolant flow path for cooling down both the cathodes 33 and the anodes 34.

Figure 7:
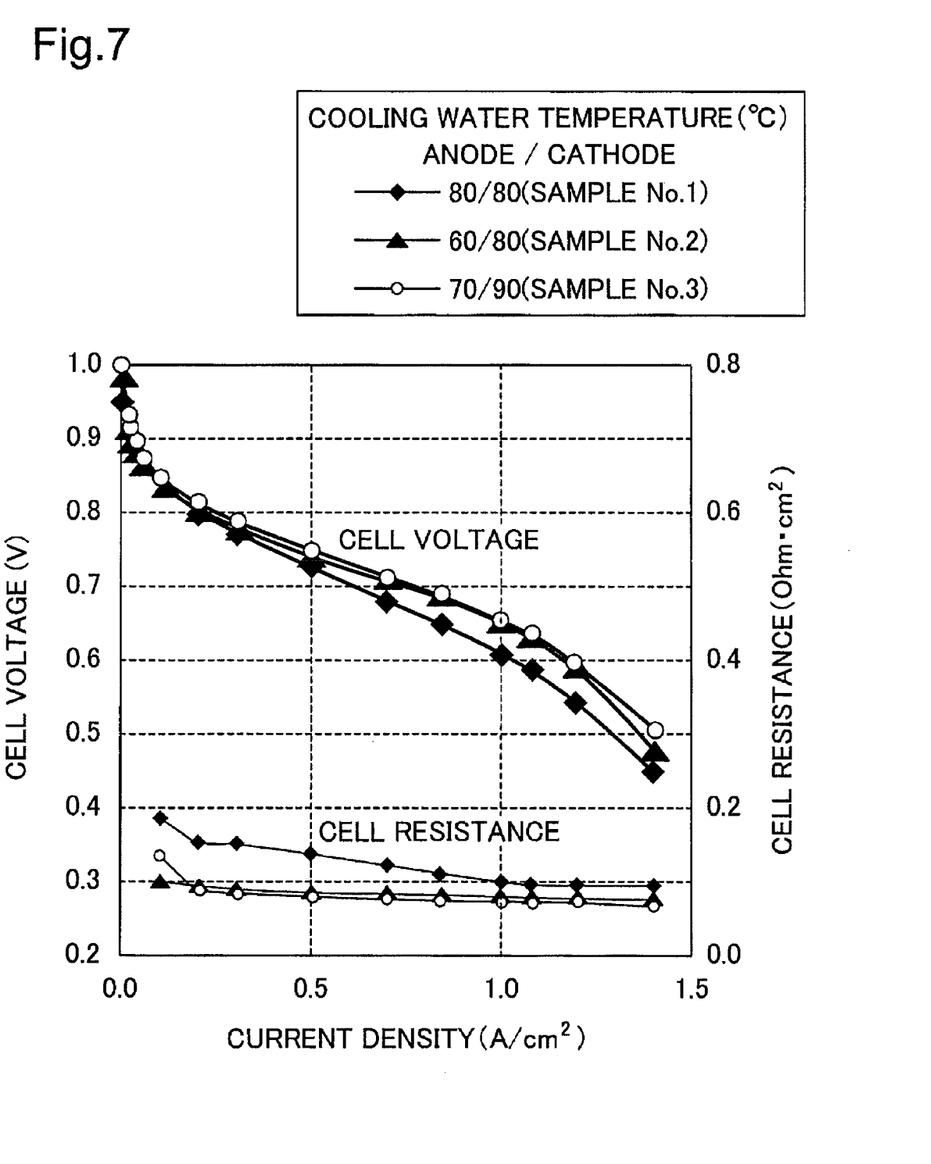
FIG. 7 is an explanatory graphical representation of the effects of the fuel cell stack 10.

FIG. 7 is an explanatory graphical representation of the effects of the fuel cell stack 10. In the experiment of FIG. 7, each fuel cell (unit cell) including the MEA 35 was prepared, and flows of cooling water having preset temperatures were supplied on the side of the cathode 33 and on the side of the anode 34, so as to adjust the temperature of the cathode 33 and the temperature of the anode 34 to specified temperature levels. For example, the flow of cooling water having the temperature of 60° C. was supplied on the side of the cathode 33 to adjust the temperature of the cathode 33 to 60° C., while the follow of cooling water having the temperature of 80° C. was supplied on the side of the anode 34 to adjust the temperature of the anode 34 to 80° C. The humidified air was supplied as the reactive gas to the cathode 33, and the humidified hydrogen was supplied as the reactive gas to the anode 34. The graph of FIG. 7 shows variations in cell voltage against the current density (V-I characteristic curves) and variations in cell resistance. The experiment was performed with a sample (sample No. 1) where the cooling water temperature for the cathode 33 and the anode 34 were set to 80° C., for the purpose of simulation of the temperature conditions of the cathode 33 and the anode 34 in the state of the operation of the fuel cell stack 10g (FIG. 6B) of the comparative example. The experiment was also performed with two samples (samples No. 2 and No. 3) where the cooling water temperature for the anode 34 was set to be lower than the cooling water temperature for the cathode 33, for the purpose of simulation of the temperature conditions of the cathode 33 and the anode 34 in the state of the operation of the fuel cell stack 10 (FIG. 6A) of the first embodiment.

As clearly understood from the V-I characteristic curves of FIG. 7, the samples No. 2 and No. 3 had the higher cell voltages than the cell voltage of the sample No. 1 at the same current density. As clearly understood from the cell resistance curves of FIG. 7, the samples No. 2 and No. 3 had the lower cell resistances than the cell resistance of the sample No. 1 at the same current density. The samples No. 2 and No. 3 accordingly had the higher power generation efficiency than the sample No. 1. As shown by the comparison between the sample No. 1 and the samples No. 2 and No. 3, there is a greater difference in cell voltage obtained at the same current density in a higher output power state (about the current density of 1.0 A/cm$^2$) than in a lower output power state (about the current density of 0.5 A/cm$^2$). That is setting the lower temperature of the anode 34 than the temperature of the cathode 33 enables the fuel cell system 1 to be driven at a desired output level in the condition of a high power requirement (for example, an uphill drive or a high-speed drive in the case of the vehicle).

Figure 8A:
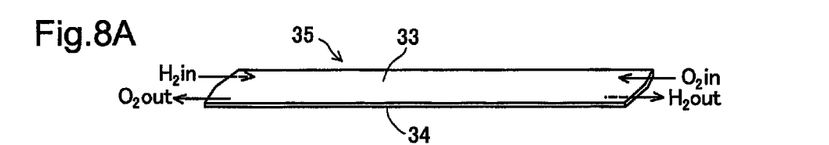
FIGS. 8A, 8B, 8C and 8D are explanatory diagrammatic representations of the effects of the fuel cell stack 10.
Figure 8B:
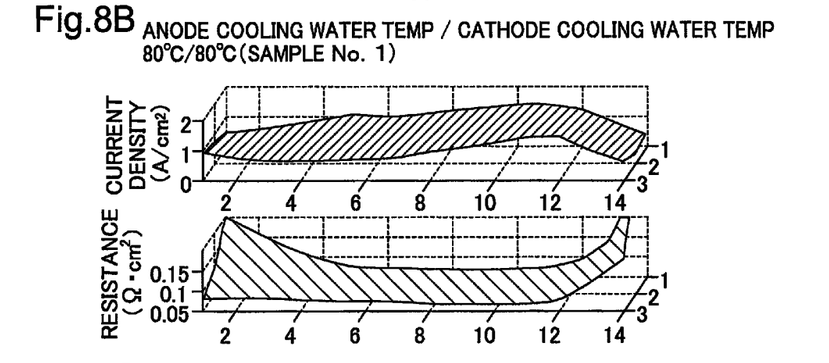
Figure 8C:
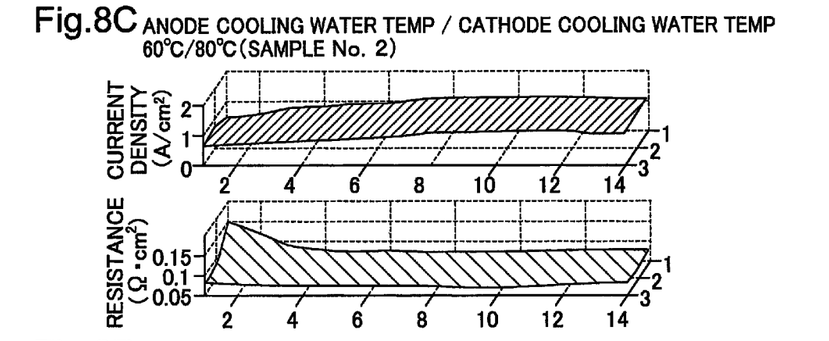
Figure 8D:
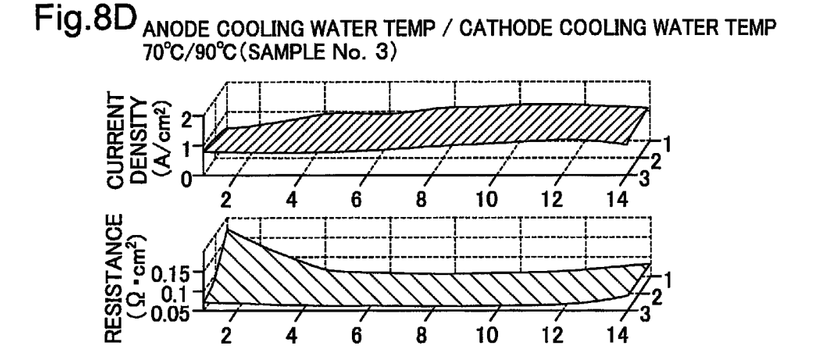

FIGS. 8A, 8B, 8C and 8D are explanatory diagrammatic representations of the effects of the fuel cell stack 10. FIG. 8A shows the MEA 35 used for the experiment of FIG. 7. FIGS. 8B through 8D show variations of the current density and of the resistance in a plurality of divisional areas of the MEA 35 divided in the in-plane direction, in the condition of the current density of 1.0 A/cm$^2$ in the experiment of FIG. 7 with the respective samples. That is, the samples of FIGS. 8B through 8D have the average current density of 1.0 A/cm$^2$ and the average resistances at the average current density of 1.0 A/cm$^2$ shown in the graph of FIG. 7.

As shown in FIGS. 8B through 8D, the samples No. 2 and No. 3 have smaller variations in distribution of the resistance in the respective divisional areas (resistance of the electrolyte membrane 31), compared with the sample No. 1. More specifically, the resistance of the sample No. 1 rises at both ends of the MEA 35 (the right end and the left end of the MEA 35 shown in FIG. 8A). The resistances of the samples No. 2 and No. 3, on the other hand, have the smaller rises at both the ends of the MEA 35, compared with the sample No. 1. That is, this shows that the samples No. 2 and No. 3 with setting the lower cooling water temperature for the anode than the cooling water temperature for the cathode have the smaller variations in moisture content in the in-plane direction of the electrolyte membrane 31 than the sample No. 1 with setting the same cooling water temperature for the anode and the cathode. That is, keeping the cathode 33, which produces water through the electrochemical reaction, at a higher temperature than the anode 34 enables a cathode side of the electrolyte membrane 31 to have a higher moisture content than the moisture content of an anode side of the electrolyte membrane 31. This accelerates the diffusion of water from the cathode side to the anode side of the electrolyte membrane 31 and thereby the diffusion of water in the in-plane direction, thus equalizing the moisture content of the electrolyte membrane 31 in the in-plane direction.

The substantially equal moisture content of the electrolyte membrane 31 in the in-plane direction equalizes the membrane resistance in the in-plane direction and thereby the current density in the in-plane direction. Such equalization reduces the possibility of local deterioration of the MEA 35 and thus keeps the performance of the MEA 35 at the sufficiently high level for a long time period.

That is, the fuel cell stack 10 of the first embodiment does not have the coolant flow path for cooling down the cathodes 33 but have the channels 25c (FIG. 3) as the coolant flow path for cooling down the anodes 34. This arrangement enables the cathode 33 to be kept at a higher temperature than the temperature of the anodes 34, as described above with reference to the samples No. 2 and No. 3 shown in FIGS. 7 and 8. The fuel cell stack 10 of the first embodiment accordingly has the more equalized moisture content of the electrolyte membrane 31, compared with the fuel cell stack 10g of the comparative example. This characteristic of the fuel cell stack 10 effectively interferes with deterioration of the MEA 35 and keeps the performance of the MEA 35 at the sufficiently high level for a long time period. The fuel cell stack of the first embodiment 10 has the improved power generation efficiency, compared with the fuel cell stack 10g of the comparative example. The fuel cell stack 10 of the first embodiment does not have the coolant flow path for cooling down the cathodes 33 and can thus increase its temperature to a desired temperature level (for example, 80 to 90° C.) in a shorter time at start of the fuel cell system 1. The fuel cell stack 10 is smaller in size than the fuel cell stack 10g (FIG. 6B) having the coolant flow path for cooling down both the cathodes 33 and the anode 34.

B. Second Embodiment

Figure 9:
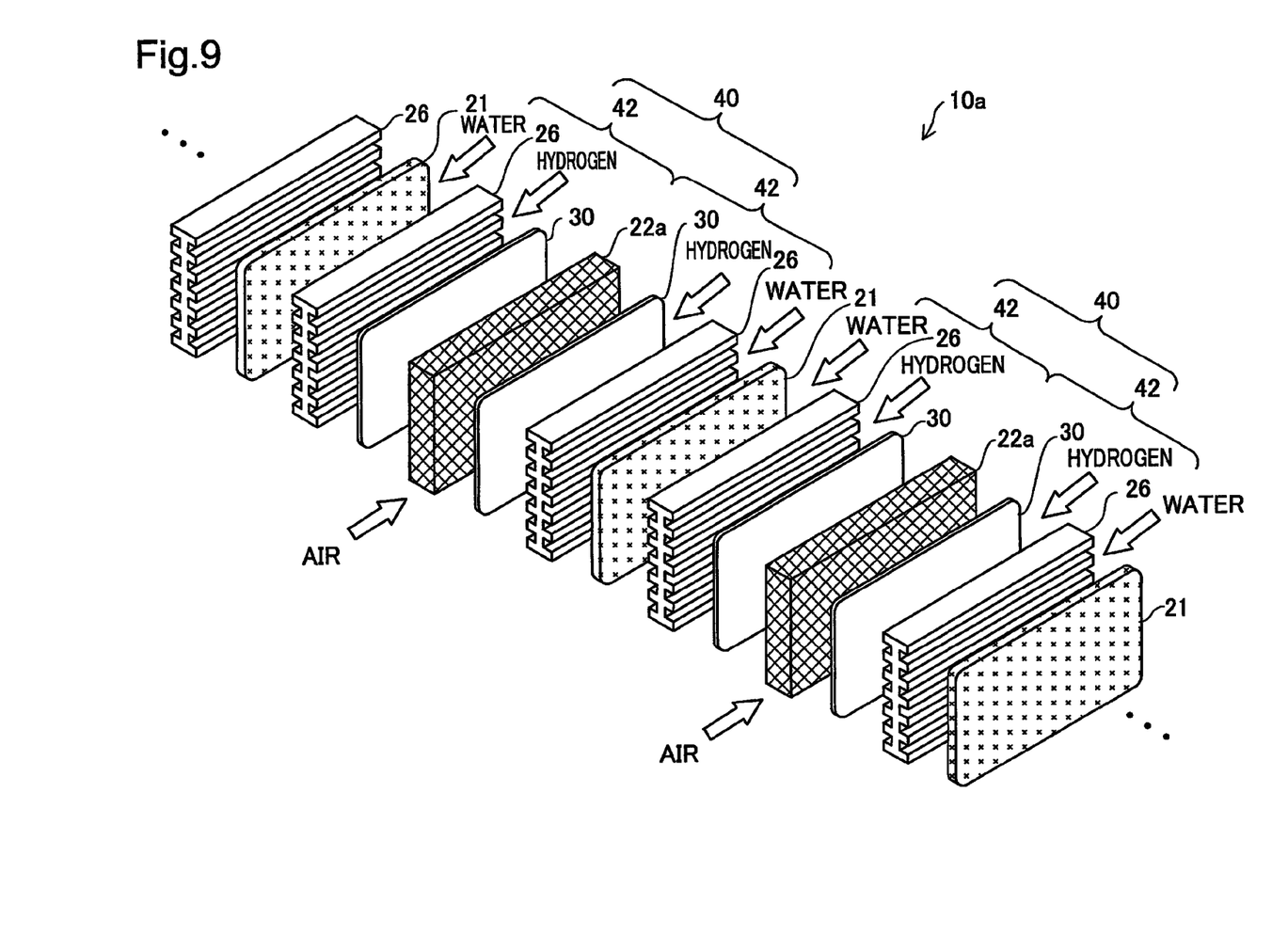
FIG. 9 is an explanatory diagrammatic representation of the internal structure of a fuel cell stack 10a of a second embodiment.

FIG. 9 is an explanatory diagrammatic representation of the internal structure of a fuel cell stack 10a of a second embodiment. The difference from the fuel cell stack 10 of the first embodiment is the structure of a first separator 22a. Otherwise the fuel cell stack 10a of the second embodiment has the similar configuration to that of the fuel cell stack 10 of the first embodiment. The like components are expressed by the like numerals and are not specifically explained here. The other components of the fuel cell system of the second embodiment (e.g., the hydrogen tank 70 and the radiator 84 shown in FIG. 1) are identical with those of the first embodiment and are thus not explained specifically. The representation of FIG. 9 corresponds to the representation of FIG. 2.

In the fuel cell stack 10a, a porous body 22a is used for the first separator serving as a member defining the air flow path (air flow path-forming member) and is located between the two MEAs 30 included in each of the fuel cell modules 40. The porous body 22a has a number of pores or voids on the outer surface and inside and is made to have electrical conductivity. The porous body 22a is made of, for example, carbon, Au, Fe, Cr, Ni, Ti, Pt, Zn, Sn, any of these alloys, and complexes containing at least one of these elements. The thickness of the porous body 22a is identical with the thickness of the first separator 22.

The air introduced from the oxidizing gas supply manifold 63 (FIG. 1) to the porous body 22a flows through the porous body 22a and is supplied to the cathodes 33 of the two MEGAs 30 located on both sides of the porous body 22a.

As described above, the fuel cell stack 10a of the second embodiment adopts the porous body 22a for the air flow path-forming member. The porous body 22a facilitates formation of the flow path for supplying air to the two cathodes 33, compared with the plate member having the channels formed on both faces (i.e., separator 22 shown in FIG. 2). Like the fuel cell stack 10 of the first embodiment, the fuel cell stack 10a of the second embodiment has the coolant flow path for cooling down the anodes 34, while not having the coolant flow path for cooling down the cathodes 33. This arrangement enables the size reduction of the fuel cell stack 10a. Like the first embodiment, the fuel cell stack 10a of the second embodiment also has the more equalized moisture content of the electrolyte membrane 31, thus effectively interfering with deterioration of the MEA 35 and keeping the performance of the MEA 35 at the sufficiently high level for a long time period. Like the first embodiment, the fuel cell stack 10a of the second embodiment also has the improved power generation efficiency.

C. Third Embodiment

Figure 10:
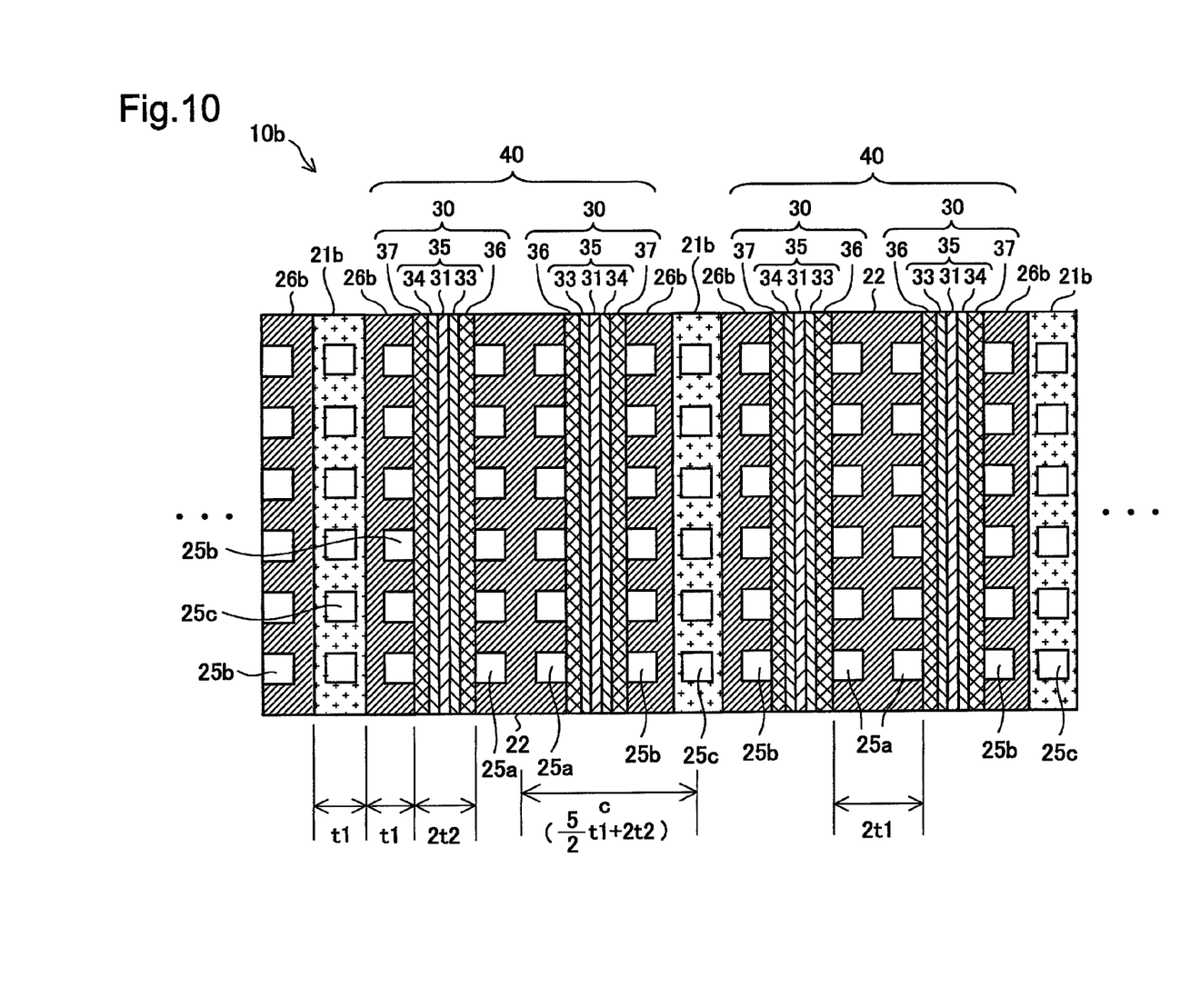
FIG. 10 is an explanatory diagrammatic representation of a fuel cell stack 10b of a third embodiment.

FIG. 10 is an explanatory diagrammatic representation of a fuel cell stack 10b of a third embodiment. The difference from the fuel cell stack 10 of the first embodiment is the structures of an insulator 21b and a separator 26b. Otherwise the fuel cell stack 10b of the third embodiment has the similar configuration to that of the fuel cell stack 10 of the first embodiment. The like components are expressed by the like numerals and are not specifically explained here. The other components of the fuel cell system of the third embodiment (e.g., the hydrogen tank 70 and the radiator 84 shown in FIG. 1) are identical with those of the first embodiment and are thus not explained specifically. The representation of FIG. 10 corresponds to the representation of FIG. 3, with omission of the external circuit 45 from the illustration of FIG. 10.

In the fuel cell stack 10b of the third embodiment, a coolant flow path 25c is formed inside the insulator 21b. The second separator 26b located adjacent to the insulator 21b has channels formed only on a single face on the side of the anode 34. The insulator 21b has a preset thickness and is made of an insulating material, such as a fluororesin. Since the coolant flow path 25c is provided inside the insulator 21b, there is no need to form channels for the coolant flow path in the second separator 26b, thus simplifying the structure of the second separator 26b.

The second separator 26b has the channels formed only on the single face and accordingly has a thickness "t1" that is half the thickness of the second separator 26 of the first embodiment. The insulator 21b includes the coolant flow path 25c and has a thickness equal to the thickness "t1" of the second separator 26b. A thickness "c" of a repeating unit in the fuel cell stack 10b is determined according to Equation (4) given below:

$$\text{Thickness ``}c\text{''}=t1+2t2+t1+t1/2=(5t1/2)+2t2 \tag{4}$$

In the fuel cell stack 10 of the first embodiment, the thickness "a" of the repeating unit is equal to 3t1+2t2+t3 (FIG. 6A). The fuel cell stack 10b of the third embodiment thus enables the further size reduction, compared with the fuel cell stack 10 of the first embodiment. Like the first embodiment, the fuel cell stack 10b of the third embodiment also has the more equalized moisture content of the electrolyte membrane 31, thus effectively interfering with deterioration of the MEA 35 and keeping the performance of the MEA 35 at the sufficiently high level for a long time period. Like the first embodiment, the fuel cell stack 10b of the third embodiment also has the improved power generation efficiency.

D. Modifications

Among the various constituents and components included in the respective embodiments discussed above, those other than the constituents and components disclosed in independent claims are additional and supplementary elements and may be omitted according to the requirements.

The invention is not limited to any of the embodiments and their applications discussed above but may be actualized in diversity of other embodiments and applications within the scope of the invention. Some examples of possible modification are given below.

D-1. Modification 1

In the embodiments discussed above, the MEGAs 30 are arranged, such that the cathodes 33 are opposed to each other in each of the fuel cell modules 40 (FIG. 3). In one modification, the MEGAs 30 may be arranged, such that the anodes 34 are opposed to each other. The fuel cell stacks 10, 10a, and 10b having such modified structure do not have the coolant flow path for cooling down the opposed anodes 34. This arrangement enables size reduction, compared with the fuel cell stack having the coolant flow path for cooling down the anodes 34.

D-2. Modification 2

In the third embodiment discussed above, the reactive gas flow paths 25a and 25b are provided by forming channels on the plate members (first and second separators) 22 and 26b. This structure is, however, neither restrictive nor essential. For example, a porous body may be used for at least one of the first and the second separators 22 and 26b. This facilitates formation of the reactive gas flow path.

D-3. Modification 3

In the embodiments discussed above, the fuel cell stacks 10 through 10b have the gas diffusion layers 36 and 37 (FIG. 3). These gas diffusion layers may, however, be omitted according to the requirements. In such modified structure, the reactive gas flow paths are preferably made of the porous body 22a (FIG. 9) to homogeneously supply the reactive gases in the in-plane direction to the cathodes 33 and the anodes 34.

D-4. Modification 4

In the embodiments discussed above, the polymer electrolyte fuel cells are used for the fuel cell stacks 10 through 10b. Any of other diverse fuel cells, such as phosphoric acid fuel cells, molten carbonate fuel cells, and solid-oxide fuel cells may similarly be used for the fuel cell stack.

D-5. Modification 5

The fuel cell system 1 including any of the fuel cell stacks 10 through 10b of the above embodiments may be mounted on diversity of moving bodies, such as ships and boats as well as vehicles to be used as the power source of the moving body. The fuel cell system 1 may also be used as a stationary power source.

What is claimed is:

1. A fuel cell stack, comprising:
   a plurality of fuel cell modules stacked in a predetermined direction,
   each of the fuel cell modules comprising:
   a first membrane electrode assembly and a second membrane electrode assembly, each including an electrolyte membrane, a cathode and an anode arranged to sandwich two faces of the electrolyte membrane, wherein the first membrane electrode assembly and the second membrane electrode assembly are arranged, such that the respective cathodes are opposed to each other;
   a first separator located between the first membrane electrode assembly and the second membrane electrode assembly to define an oxygen flow path arranged to supply oxygen to the cathodes included in the first membrane electrode assembly and the second membrane electrode assembly;
   a hydrogen flow path arranged to supply hydrogen to the anodes included in the first membrane electrode assembly and the second membrane electrode assembly; and
   a coolant flow path arranged to cool down the anodes included in the first membrane electrode assembly and the second membrane electrode assembly,
   wherein the fuel cell stack does not have a coolant flow path for cooling down the cathodes, and
   wherein the first separator serves as a common flow path-forming member for supplying oxygen to the cathodes included in the first membrane electrode assembly and the second membrane electrode assembly.

2. The fuel cell stack in accordance with claim 1, wherein the first separator comprises a porous body through which oxygen is supplied to the cathodes included in the first membrane electrode assembly and the second membrane electrode assembly.

3. The fuel cell stack in accordance with claim 1, wherein the first separator is a plate member having a first face opposed to the first membrane electrode assembly and a second face opposed to the second membrane electrode assembly, and
   the oxygen flow path is provided as channels formed on the first face and the second face.

4. The fuel cell stack in accordance with claim 1, further comprising:
   an insulator located between an adjacent pair of the fuel cell modules,
   wherein the coolant flow path is formed inside the insulator.

5. The fuel cell stack in accordance with claim 1, further comprising:
   an external circuit arranged to electrically connect the first membrane electrode assembly and the second membrane electrode assembly in parallel with each other.

* * * * *